United States Patent
Kubota et al.

(10) Patent No.: US 7,220,056 B2
(45) Date of Patent: May 22, 2007

(54) SLIDING BEARING AND BEARING MECHANISM HAVING THE SAME

(75) Inventors: Shuichi Kubota, Fujisawa (JP); Takashi Horiguchi, Fujisawa (JP); Hidetoshi Kaida, Fujisawa (JP)

(73) Assignee: Oiles Corporation, Tokyo (JP)

( * ) Notice: Subject to any disclaimer, the term of this patent is extended or adjusted under 35 U.S.C. 154(b) by 422 days.

(21) Appl. No.: 10/645,841

(22) Filed: Aug. 22, 2003

(65) Prior Publication Data

US 2004/0076353 A1    Apr. 22, 2004

(30) Foreign Application Priority Data

Aug. 28, 2002  (JP)  ............... 2002-248664
Apr. 30, 2003  (JP)  ............... 2003-125420
Jul. 16, 2003  (JP)  ............... 2003-275184

(51) Int. Cl.
*F16C 27/06*    (2006.01)
*F16C 33/02*    (2006.01)

(52) U.S. Cl. ............... 384/215; 384/220; 384/276; 384/296

(58) Field of Classification Search ............ 384/215, 384/220, 275, 276, 295, 296, 297, 299, 300, 384/428

See application file for complete search history.

(56) References Cited

U.S. PATENT DOCUMENTS

| | | | | |
|---|---|---|---|---|
| 2,851,314 A | * | 9/1958 | Thomson | ............... 384/222 |
| 3,415,155 A | * | 12/1968 | Riddell et al. | ........... 411/548 |
| 3,431,033 A | | 3/1969 | Dangauthier | |
| 3,781,073 A | * | 12/1973 | Jorn et al. | ............. 384/291 |
| 3,829,184 A | * | 8/1974 | Chevret | ............... 384/280 |
| 3,966,276 A | * | 6/1976 | Bellarbre et al. | ......... 384/215 |
| 4,513,990 A | * | 4/1985 | Morita et al. | ......... 280/124.169 |
| 5,669,718 A | * | 9/1997 | Sakairi et al. | ........... 384/220 |
| 6,485,180 B2 | * | 11/2002 | Mena | ............. 384/222 |
| 2002/0085778 A1 | * | 7/2002 | Mena | ............. 384/276 |
| 2003/0039420 A1 | * | 2/2003 | Davies et al. | ........... 384/300 |

FOREIGN PATENT DOCUMENTS

| | | |
|---|---|---|
| DE | 1 077 924 | 3/1960 |
| DE | 1 219 344 | 6/1966 |
| DE | 2 320 338 | 10/1974 |
| DE | 89 11 391 | 11/1989 |

(Continued)

OTHER PUBLICATIONS

International Search Report mailed Aug. 18, 2005.

*Primary Examiner*—Thomas R. Hannon
*Assistant Examiner*—Justin Krause
(74) *Attorney, Agent, or Firm*—Nixon & Vanderhye P.C.

(57) ABSTRACT

A sliding bearing for a steering column includes: a cylindrical bearing body; flat surfaces formed integrally on an inner peripheral surface of the bearing body; first slits extending from one end face of the bearing body to this side of the other end face of the bearing body; second slits extending from this side of the other end face of the bearing body to the one end face of the bearing body; grooves formed in an outer peripheral surface of the bearing body; and elastic rings which are respectively fitted in the grooves in such a manner as to project from the outer peripheral surface of the bearing body and to reduce the diameter of the bearing body.

28 Claims, 9 Drawing Sheets

FOREIGN PATENT DOCUMENTS

| | | |
|---|---|---|
| FR | 74.13644 | 11/1974 |
| FR | 2 532 700 | 3/1984 |
| JP | 44-30925 | 12/1969 |
| JP | 50-29943 | 3/1975 |
| JP | 56-39747 | 9/1981 |
| JP | 2566042 | 12/1997 |
| JP | 11-201154 | 7/1999 |

* cited by examiner

SLIDING BEARING AND BEARING MECHANISM HAVING THE SAME

BACKGROUND OF THE INVENTION

1. Field of the Invention

The present invention relates to a sliding bearing interposed between, for example, a steering column tube and a steering column shaft to rotatably support the steering column shaft of an automobile, a sliding bearing interposed between a rack shaft and a tubular member so as to support the rack shaft linearly movably, and a bearing mechanism having such a bearing.

2. Description of the Related Art

As a bearing for a steering column for rotatably supporting a steering column shaft (hereafter referred to as the column shaft) of an automobile, a rolling bearing constituted by a ball bearing or a sliding bearing formed of a synthetic resin is used.

In general, conditions for rotation such as a load and a velocity are not so stringent for the bearing for rotatably supporting the column shaft. However, the vibration absorbing characteristic for absorbing vibrations applied to the column shaft and stability in frictional torque are required at the time of idling or the like.

The rolling bearing is stable in the frictional torque, but is inferior in the vibration absorbing characteristic. In addition, the dimensional accuracy of a steering column tube (hereafter referred to as the column tube) for fixing the rolling bearing and the column shaft supported by the rolling bearing need to be finished to high accuracy. Therefore, on top of the fact that the rolling bearing itself is expensive, there is a problem in that the fabrication cost becomes high.

The sliding bearing has advantages in that, as compared with the rolling bearing, the sliding bearing is low in cost and excels in the vibration absorbing characteristic. Nevertheless, there is a problem in that since an appropriate clearance (axial gap) is required between the sliding bearing and the column shaft, collision noise occurs between the column shaft and the bearing, and is transmitted to the driver of the automobile as unpleasant sound. If the clearance between the sliding bearing and the column shaft is made small to suppress the occurrence of this collision noise, the frictional torque increases, and the difference in frictional torque between at the time of rotation start and during rotation becomes large. At the same time, the small clearance constitutes a factor hampering the stability in frictional torque, such as the occurrence of variations in frictional torque during rotation due to a stick-slip phenomenon or the like caused by dimensional errors in the outside diameter of the column shaft.

In addition, although the column shaft is rotatably supported by the column tube by means of the bearing, the roundness of the inside diameter of the column tube is normally not very high. If the sliding bearing made of a synthetic resin is press fitted and fixed into such a column tube, the sliding bearing is strained by being affected by the roundness of the inside diameter of the column tube, producing a difference in the clearance with the column shaft. This also hampers the stability of the frictional torque. (Refer to JP-A-11-201154 and JP-UM-B-56-39747 as prior arts)

The above-described problems occur not only in the sliding bearing interposed between the column shaft and the column tube which rotatably supports this column shaft, but can similarly occur, for example, in a bearing interposed between a rack shaft and a tubular member (tube) which supports the rack shaft linearly movably.

SUMMARY OF THE INVENTION

The present invention has been devised in view of the above-described aspects, and its object is to provide a sliding bearing and a bearing mechanism having the bearing, which make it possible to eliminate the noise of collision with the shaft such as the column shaft and the rack shaft, make it possible to reduce the linear-motion frictional resistance or the frictional torque, make it possible to make small the difference in the linear-motion frictional resistance or the frictional torque between at the time of a linear motion start or rotation start and during linear motion or rotation, and make it possible to obtain stable linear-motion frictional resistance or frictional torque without being affected by such as dimensional errors in the outside diameter of the shaft and the roundness of the inside diameter of the tube such as the column tube and the tubular member, thereby making it possible to support the shaft smoothly and effect the linear motion or rotation of the shaft more smoothly.

According to a first aspect of the invention, there is provided a sliding bearing comprising: a cylindrical bearing body; a plurality of sliding surfaces provided on an inner peripheral surface of the bearing body and spaced apart from each other in a circumferential direction; a first slit portion provided in the bearing body and extending in an axial direction from one end face of the bearing body to this side of another end face of the bearing body; a second slit portion provided in the bearing body and extending in the axial direction from the other end face of the bearing body to this side of the one end face of the bearing body; at least one groove portion provided in an outer peripheral surface of the bearing body; and an elastic ring which is fitted in the groove portion in such a manner as to project from the outer peripheral surface of the bearing body and to reduce a diameter of the bearing body.

In accordance with the sliding bearing according to the above-described first aspect, when the bearing body is inserted into the tube and is fitted to the inner peripheral surface of one end portion of the tube, the elastic ring projecting from the outer peripheral surface of the bearing body undergoes elastic deformation with an interference with respect to the inner peripheral surface of the tube. This elastic deformation makes it possible to absorb dimensional errors of the tube in such as the roundness of its inside diameter. In addition, according to such a sliding bearing, the bearing body, whose diameter is capable of being freely reduced by the slit portions alternately having open ends at both end faces of the bearing body, tightens by means of the plurality of sliding surfaces the shaft inserted therein as its diameter is reduced by the elastic ring. Therefore, the clearance with the shaft can be set to zero, thereby making it possible to eliminate the collision with the shaft. Hence, it is possible to prevent the occurrence of the collision noise which is transmitted to a driver as unpleasant sound. In addition, it is possible to make small the difference in the linear-motion frictional resistance or the frictional torque between at the time of a linear motion start or rotation start and during linear motion or rotation, and obtain stable linear-motion frictional resistance or frictional torque by absorbing dimensional errors in the outside diameter of the shaft.

The elastic ring may be a so-called O-ring having a circular cross section, but may be a ring of other shapes, such as an X-shaped cross section, a U-shaped cross section, and a trapezoidal cross section. As the elastic material for forming the elastic ring, it is possible to use any one of natural rubber, synthetic rubber, and an elastic thermoplastic synthetic resin, e.g., a polyester elastomer.

As the elastic ring for imparting an interference, it is possible to cite as a preferred example an elastic ring whose outside diameter is approximately 0.3 mm to 1.0 mm greater than the diameter of the inner peripheral surface of the tube and whose inside diameter is approximately 0.3 mm to 1.0 mm smaller than the diameter of the bottom of the groove portion, although the size of the elastic ring depends on its modules of elasticity. In brief, it suffices if the elastic ring has an interference with the inner peripheral surface of the tube, projects from the outer peripheral surface of the bearing body, and is adapted to reduce the diameter of the bearing body to such an extent as to set the clearance between the sliding surface and the shaft to zero by tightening the shaft with appropriate resiliency by means of the plurality of sliding surfaces. Specifically, it suffices at least if the outside diameter of the elastic ring is greater than the diameter of the inner peripheral surface of the tube, and the inside diameter of the elastic ring is smaller than the diameter of the bottom of the groove portion.

In the present invention, as with the sliding bearing according to a second aspect thereof, preferably, the first slit portion and the second slit portion are provided in plural numbers in the bearing body, each of the slit portions extends in the axial direction between adjacent ones of the sliding surfaces, and each of the first slit portions and each of the second slit portions are arranged alternately in the circumferential direction.

As with the sliding bearing according to a third aspect of the invention, each of the sliding surfaces may preferably be provided on the inner peripheral surface of the bearing body between positions each axially spaced apart a predetermined distance from each of the end faces of the bearing body. In addition, as with the sliding bearing according to a fourth aspect of the invention, the plurality of sliding surfaces may preferably be arranged at equal intervals in the circumferential direction.

With the sliding bearing according to a fifth aspect of the invention, in the sliding bearing according to any one of the above-described aspects, at least two groove portions axially spaced apart from each other are provided in the outer peripheral surface of the bearing body, at least two elastic rings are respectively fitted in the groove portions in such a manner as to project from the outer peripheral surface of the bearing body and to reduce the diameter of the bearing body, and an axially central portion of each of the sliding surfaces is located between the two groove portions in the axial direction.

In the sliding bearing according to the fifth aspect, each of the sliding surfaces may preferably be provided on the inner peripheral surface of the bearing body between the two groove portions in the axial direction as with the sliding bearing according to a sixth aspect of the invention. In addition, as with the sliding bearing according to a seventh aspect of the invention, each of the sliding surfaces may preferably be provided on the inner peripheral surface of the bearing body by extending beyond the two groove portions in the axial direction.

In the present invention, the elastic ring to be fitted in the groove portion may preferably have a volume greater than a volumetric capacity of the groove portion as with the sliding bearing according to an eighth aspect of the invention. It is not necessary for the elastic ring to be disposed in the groove portion in close contact with the bearing body without a gap, and may be fitted in the groove portion with a slight gap with respect to the bearing body. The elastic ring may be adapted to be deformed and fill the groove portion completely in a case where the sliding bearing according to the invention is interposed between the tube and the shaft, and the portion of the elastic ring projecting from the outer peripheral surface of the bearing body is properly pressed by the tube. Alternatively, an arrangement may be provided such that even in a case where the elastic ring is thus pressed properly by the tube, the elastic ring has a slight gap with respect to the bearing body, whereas in a case where the tube has been off-centered from a proper position with respect to the shaft due to an unintentional external force, and has been locally pressed strongly by the tube, the elastic ring is deformed at the excessively pressed portion and fills the groove portion completely to increase the rigidity, thereby counteracting the unintentional off-center of the tube.

In the sliding bearing in accordance with the invention, as with the sliding bearing according to a ninth aspect of the invention, preferably, the elastic ring at an outer peripheral surface thereof is fitted to an inner peripheral surface of a tube with an interference, and the bearing body is fitted at the sliding surface thereof on an outer peripheral surface of a shaft by tightening the shaft with the resiliency of the elastic ring, to cause the bearing body to be interposed between the tube and the shaft.

As for the sliding bearing to be interposed between the tube and the shaft, as with the sliding bearing according to a 10th aspect of the invention, a clearance having a width of 0.3% to 10% of a radial maximum thickness of the bearing body at a portion, which constitutes a free end portion of the bearing body with respect to the tube, is preferably produced between the inner peripheral surface of the tube and the outer peripheral surface of the bearing body at the portion constituting the free end portion thereof.

If the clearance is less than 0.3%, there is a possibility that the tube easily comes into contact with the bearing body to produce abnormal noise and the like in a case where the tube has been off-centered from a proper position with respect to the shaft due to an unintentional external force. If the clearance is greater than 10%, there is a possibility that the tube is easily off-centered greatly from a proper position with respect to the shaft due to an unintentional external force, causing a decline in the aligning effect based on the sliding bearing. Accordingly, if the sliding bearing is arranged as in the 10th aspect of the invention, it is possible to avoid the contact of the tube with the bearing body, and the tube can be reliably held at a proper position with respect to the shaft.

In the present invention, as with the sliding bearing according to an 11th aspect thereof, preferably, the shaft may be a column shaft, and the tube may be a column tube. Alternatively, as with the sliding bearing according to a 12th aspect of the invention, preferably, the shaft may be a rack shaft, and the tube may be a tubular member. Furthermore, the shaft and the tube may be other types of shaft and tube, respectively.

In the present invention, each of the sliding surfaces may be one of a flat surface, an arcuate convex surface, and an arcuate concave surface as with the sliding bearing according to a 13th aspect of the invention.

In addition, in the present invention, as with the sliding bearing according to a 14th aspect thereof, each of the sliding surfaces may be a flat surface, and a distance between the sliding surfaces radially opposing each other and parallel to each other may be smaller than an inside diameter of the bearing body at each of the end faces thereof.

Alternatively, as with the sliding bearing according to a 15th aspect thereof, each of the sliding surfaces may be an arcuate convex surface, and a distance between apices of the sliding surfaces radially opposing each other may be smaller than an inside diameter of the bearing body at each of the end faces thereof. Still alternatively, as with the sliding bearing according to a 16th aspect thereof, each of the sliding surfaces may be an arcuate concave surface, and a distance between bottoms of the sliding surfaces radially opposing each other may be smaller than an inside diameter of the bearing body at each of the end faces thereof.

In addition, in the present invention, as with the sliding bearing according to a 17th aspect thereof, each of the sliding surfaces may be a flat surface, and each of the sliding surfaces at an axially central portion thereof may be adapted to tighten the shaft with the resiliency of the elastic ring. Alternatively, as with the sliding bearing according to an 18th aspect thereof, each of the sliding surfaces may be an arcuate convex surface, and each of the sliding surfaces at an apex thereof may be adapted to tighten the shaft with the resiliency of the elastic ring. Still alternatively, as with the sliding bearing according to a 19th aspect thereof, each of the sliding surfaces is an arcuate concave surface, and each of the sliding surfaces at a bottom thereof is adapted to tighten the shaft with the resiliency of the elastic ring. Here, as with the sliding bearing according to a 20th aspect thereof, the arcuate concave surface preferably has a curvature smaller than that of the outer peripheral surface of the shaft or a curvature substantially equal thereto.

In a preferred example, as with the sliding bearing according to a 21st aspect of the invention, the inner peripheral surface of the bearing body has a first tapered surface extending with a gradually reduced diameter from the one end face of the bearing body to an axial one end of the sliding surface, as well as a second tapered surface extending with a gradually reduced diameter from the other end face of the bearing body to an axial other end of the sliding surface. Here, as with the sliding bearing according to a 22nd aspect of the invention, the first tapered surface may have an axial length greater than that of the second tapered surface. In addition, as with the sliding bearing according to a 23rd aspect of the invention, the first tapered surface may have a cone angle greater than that of the second tapered surface.

According to the sliding bearing having such a first tapered surface, the bearing body can be easily fitted to the outer peripheral surface of the shaft from the first tapered surface side, with the result that it is possible to substantially reduce the number of assembly steps.

In the sliding bearing in accordance with the invention, as with the sliding bearing according to a 24th aspect thereof, preferably, the plurality of sliding surfaces and the bearing body are integrally formed of a synthetic resin.

As the synthetic resin for forming the plurality of sliding surfaces and the bearing body, it is possible to cite as a preferred example a thermoplastic synthetic resin such as polyacetal resin, polyamide resin, polyethylene resin, tetrafluoroethylene resin, or the like.

A bearing mechanism in accordance with the invention comprises: a tube; a shaft inserted and fitted in the tube; and the sliding bearing according to any one of the above-described aspects interposed between the tube and the shaft. Here, the elastic ring at the outer peripheral surface thereof is fitted to the inner peripheral surface of the tube with an interference, the bearing body is disposed on the inner peripheral surface of the tube with a clearance between the outer peripheral surface thereof and the inner peripheral surface of the tube, and the bearing body is fitted on an outer peripheral surface of the shaft by tightening the shaft with the resiliency of the elastic ring by means of the sliding surfaces.

According to the bearing mechanism in accordance with the invention, since the above-described sliding bearing is provided, it is possible to eliminate the noise of collision with the shaft, and the steering operation and the like can be effected more smoothly.

In the above-described bearing mechanism, it is preferable to use an elastic ring whose outside diameter is greater than a diameter of the inner peripheral surface of the tube, and whose inside diameter is smaller than a diameter of the bottom of the groove portion.

Furthermore, in the bearing mechanism in accordance with the invention, it is preferred that the tube integrally has a pawl portion which engages the bearing body, or have one of a recessed portion and a through hole which engages the bearing body. Such a pawl portion or such a recessed portion or a through hole makes it possible to effectively prevent the sliding bearing from coming off the tube.

In accordance with the present invention, it is possible to provide a sliding bearing and a bearing mechanism having the bearing, which make it possible to eliminate the noise of collision with the shaft such as the column shaft and the rack shaft, make it possible to reduce the linear-motion frictional resistance or the frictional torque, make it possible to make small the difference in the linear-motion frictional resistance or the frictional torque between at the time of a linear motion start or rotation start and during linear motion or rotation, and make it possible to obtain stable linear-motion frictional resistance or frictional torque without being affected by such as dimensional errors in the outside diameter of the shaft and the roundness of the inside diameter of the tube such as the column tube and the tubular member, thereby making it possible to support the shaft smoothly and effect the linear motion or rotation of the shaft more smoothly.

Hereafter, a description will be given of the preferred embodiments of the invention with reference to the drawings. It should be noted that the present invention is not limited to these embodiments

BRIEF DESCRIPTION OF THE DRAWINGS

FIG. 1 is applied;

DESCRIPTION OF THE PREFERRED EMBODIMENTS

Figure 4:
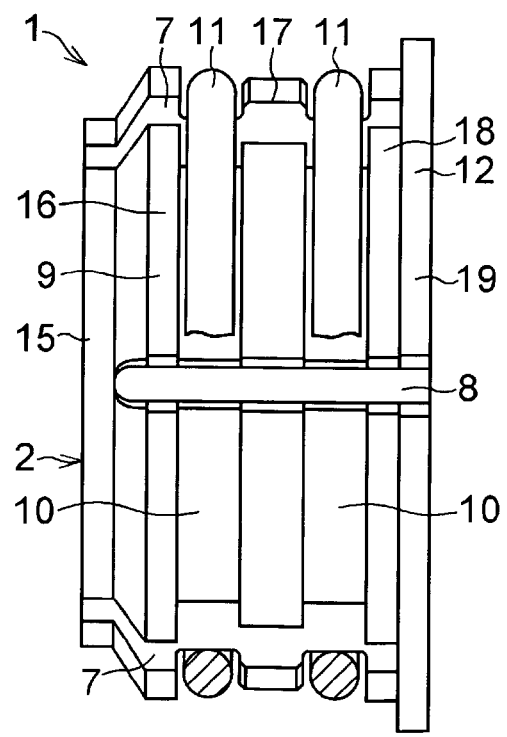
FIG. 4 is an explanatory appearance diagram also illustrating the elastic rings in the embodiment shown in FIG. 1.
Figure 5:
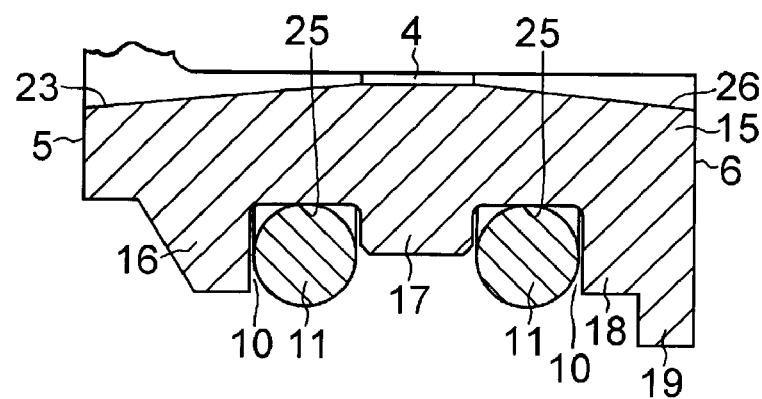
FIG. 5 is a partial enlarged explanatory diagram also illustrating the elastic rings in the embodiment shown in FIG. 1.
Figure 6:
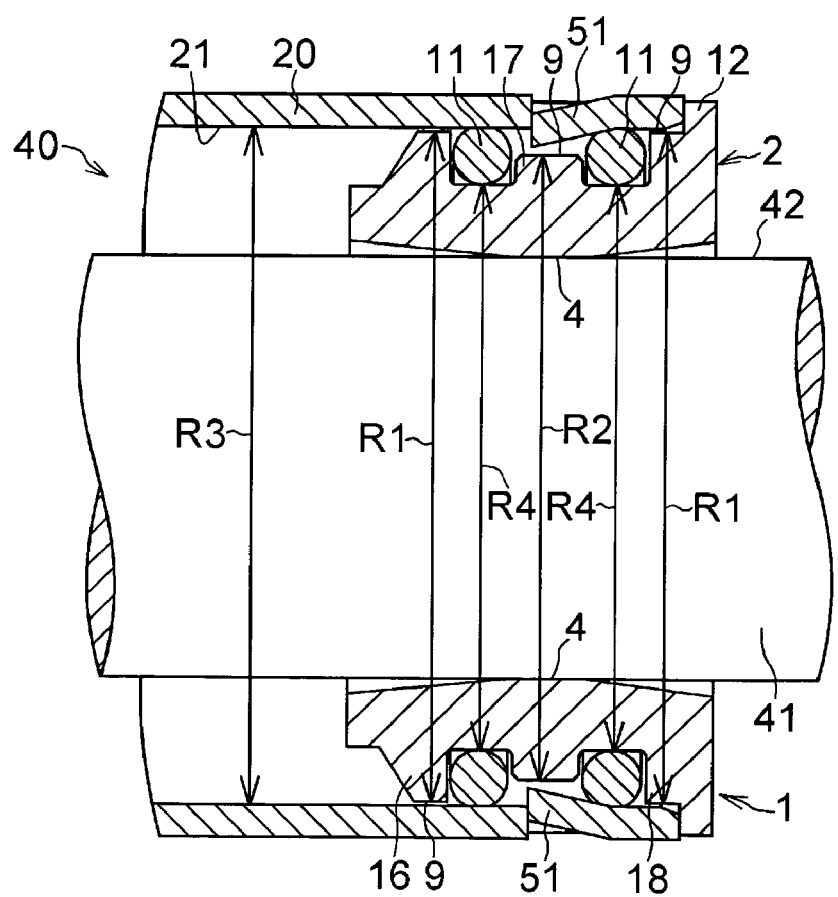
FIG. 6 is an explanatory cross-sectional view of an example of a steering column mechanism to which the embodiment shown is

In FIGS. 1 to 4, a sliding bearing 1 for a steering column in accordance with this embodiment serving as a sliding bearing is comprised of a cylindrical bearing body 2; a plurality of, in this embodiment six, flat surfaces 4 provided on an inner peripheral surface 3 of the bearing body 2 and serving as sliding surfaces; three slits 7 provided in the bearing body 2 and extending in an axial direction A between adjacent ones of the flat surfaces 4 from one end face 5 of the bearing body 2 to this side of the other end face 6 of the bearing body 2; three slits 8 provided in the bearing body 2 and extending in the axial direction A between adjacent ones of the flat surfaces 4 from the other end face 6 of the bearing body 2 to this side of the one end face 5 of the bearing body 2; at least one, in this embodiment two, grooves 10 provided in an outer peripheral surface 9 of the bearing body 2; and at least one, in this embodiment two, elastic rings 11 which are respectively fitted in the grooves 10 in such a manner as to project from the outer peripheral surface 9 of the bearing body 2 and to reduce the diameter of the bearing body 2 (see FIGS. 4, 5, and 6).

The bearing body 2 and the flat surfaces 4 are integrally formed of a synthetic resin, e.g., a thermoplastic synthetic resin, such as polyacetal resin and polyamide resin.

The bearing body 2 includes a hollow cylindrical portion 15 having end faces 5 and 6 and an inner peripheral surface 3 on its inner surface; three annular projections 16, 17, and 18 provided integrally on an outer surface of the hollow cylindrical portion 15 and defining the two grooves 11; and an annular collar 19 provided on an outer surface of the hollow cylindrical portion 15 on the end face 6 side.

As shown in FIG. 6, diameters R1 of the outer peripheral surface 9 of the bearing body 2 at the projections 16 and 18 are mutually equal, are greater than a diameter R2 of the outer peripheral surface 9 of the bearing body 2 at the projection 17, and are smaller than a diameter R3 of a cylindrical inner peripheral surface 21 of a column tube 20 serving as a tube.

The six flat surfaces 4 are arranged at equal intervals about an axis X, i.e., at angular intervals of 60°. The respective flat surfaces 4 are provided between positions respectively spaced apart predetermined distances in the axial direction A from both end faces 5 and 6 of the bearing body 2, and are provided on the inner peripheral surface 3 of the bearing body 2 between the two grooves 10 in the axial direction A. Moreover, a central portion, as viewed in the axial direction A, of each flat surface 4 is located between the two grooves 10 in the axial direction A.

The inner peripheral surface 3 of the bearing body 2 has, in addition to the flat surfaces 4, a tapered surface 23 which extends with a gradually reduced diameter from the one end face 5 of the bearing body 2 to one end 22, as viewed in the axial direction A, of the flat surface 4, as well as a tapered surface 26 which extends with a gradually reduced diameter from the other end face 6 of the bearing body 2 to the other end 24, as viewed in the axial direction A, of the flat surface 4. The distance L between the flat surfaces 4 radially opposing each other and parallel to each other is smaller than the inside diameter r of the inner peripheral surface 3 of the bearing body 2 at the end faces 5 and 6.

The respective slits 7 which are open on the end face 5 side are arranged at mutually equal intervals about the axis X, i.e., at angular intervals of 120°. The slits 7 extend in the axial direction A to the vicinities of the end face 6 by extending beyond the groove 10 on the end face 6 side, and are open on the end face 6 side. Meanwhile, the slits 8 each arranged between adjacent ones of the slits 7 about the axis X are also arranged at mutually equal intervals about the axis X, i.e., at angular intervals of 120°. The slits 8 extend in the axial direction A to the vicinities of the end face 5 by extending beyond the groove 10 on the end face 5 side. Such slits 7 and 8 are arranged alternately about the axis X at mutually equal intervals about the axis X, i.e., at angular intervals of 60°.

The slits 7 and 8 may be respectively provided singly, but if they are arranged as in this embodiment, the reduced diameter of the bearing body 2 can be obtained uniformly and easily, so that this arrangement is preferable.

The two grooves 10 are provided in the outer peripheral surface 9 of the bearing body 2 in such a manner as to be spaced apart from each other in the axial direction A.

In a state in which each elastic ring 11 formed of an O-ring is not fitted to the cylindrical inner peripheral surface 21 of the column tube 20 but fitted in the groove 10, the elastic ring 11 has an outside diameter greater than the diameter of the cylindrical inner peripheral surface 21 of the column tube 20. Further, in a state in which the elastic ring 11 is not fitted to the cylindrical inner peripheral surface 21 of the column tube 20 and not fitted in the groove 10, the elastic ring 11 has an inside diameter smaller than the diameter R4 (see FIG. 6) of a bottom 25 of the groove 10. Furthermore, the elastic ring 11 is fitted in the groove 10 in such a manner as to project from the outer peripheral surface 9 of the bearing body 2 at the projections 16 and 18 and to reduce the diameter of the bearing body 2. Each of the elastic rings 11 has a volume greater than the volumetric capacity of the groove 10 into which it is fitted. Even if the elastic ring 11 is tightened and deformed and is filled in the groove 10 without a gap, the elastic ring 11 partially projects from the outer peripheral surface 9.

As shown in FIG. 6, a steering column mechanism 40 of this embodiment serving as a bearing mechanism includes the column tube 20, a column shaft 41 inserted and fitted in the column tube 20, and the above-described sliding bearing 1 for a steering column interposed between the column tube 20 and the column shaft 41. Each elastic ring 11 is fitted to the inner peripheral surface 21 of the column tube 20 with an interference at its outer peripheral surface. The bearing body 2 is disposed on the inner peripheral surface 21 of the column tube 20 with a clearance between its outer peripheral surface 9 and the inner peripheral surface 21 of the column tube 20. At the same time, the bearing body 2 is fitted on an outer peripheral surface 42 of the column shaft 41 by tightening the column shaft 41 with the resiliency of the elastic rings 11 by means of its flat surfaces 4.

The column tube 20 integrally has at least one, in this embodiment a plurality of, pawl portions 51 which engage the bearing body 2. Each pawl portion 51 is formed such that a U-shaped slit is formed in the column tube 20, and the portion of the column tube 20 surrounded by such a U-shaped slit is pressed from the outside by a press or the like after the sliding bearing 1 for a steering column is fitted in the column tube 20. It suffices if each pawl portion 51 projects maximally into the column tube 20 at the position of the projection 17. The sliding bearing 1 for a steering column is prevented from coming off from inside the column tube 20 by the pawl portions 51.

As described above, the sliding bearing 1 for a steering column is interposed between the column tube 20 and the column shaft 41 such that the elastic rings 11 are fitted to the inner peripheral surface 21 of the column tube 20 with an interference at its outer peripheral surface, and the bearing body 2 is fitted on the outer peripheral surface 42 of the column shaft 41 while tightening the column shaft 41 with the resiliency of the elastic rings 11 at the axially central portions of the flat surfaces 4. In this sliding bearing 1 for a steering column, as the elastic rings 11 are fitted in the grooves 10 in the outer peripheral surface 9 of the bearing body 2, the diameter of the bearing body 2 is reduced by the resilient compressive force of the slits 7 and the elastic rings 11. When the column shaft 41 is inserted and fitted to the inner peripheral surface 3 of the bearing body 2 in this state, the diameter of the bearing body 2 is enlarged by the slits 7 against the resilient compressive force of the elastic rings 11. At the same time, the column shaft 41 is tightened by the flat surfaces 4 with the resilient compressive force of the elastic rings 11.

Accordingly, the clearance between the flat surfaces 4 and the column shaft 41 becomes zero, thereby making it possible to eliminate the collision between the bearing body 2 and the column shaft 41. Consequently, collision noise which is transmitted to a driver as unpleasant sound does not occur.

In addition, since the elastic rings 11 fitted in the grooves 10 of the bearing body 2 have an interference with respect to the inner peripheral surface 21 of the column tube 20, the elastic rings 11 undergo elastic deformation, and are capable of absorbing dimensional errors of the column tube 20 in such as the roundness of its inside diameter by virtue of the elastic deformation.

According to the above-described sliding bearing 1 for a steering column, when the elastic rings 11 fitted in the grooves 10 in the outer peripheral surface 9 of the bearing body 2 are press fitted and fixed to the inner peripheral surface 21 of one end portion of the column tube 20, the elastic rings 11 projecting from the outer peripheral surface 9 of the bearing body 2 undergo elastic deformation with an interference with respect to the inner peripheral surface 21 of the column tube 20. This elastic deformation makes it possible to absorb dimensional errors of the column tube 20 in such as the roundness of its inside diameter. In addition, according to such a sliding bearing 1 for a steering column, the bearing body 2, whose diameter is capable of being freely reduced by the slits 7 and 8, tightens by means of its flat surfaces 4 the column shaft 41 inserted and fitted to its inner peripheral surface 3 as its diameter is reduced by the elastic rings 11. Therefore, the clearance with the column shaft 41 can be set to zero, thereby making it possible to eliminate the collision with the column shaft 41. Hence, according to the steering column mechanism 40, it is possible to prevent the occurrence of the collision noise which is transmitted to the driver as unpleasant sound.

Further, since the flat surfaces 4 are formed of a synthetic resin, the frictional torque with the outer peripheral surface 42 of the column shaft 41 can be made small. Hence, according to the steering column mechanism 40, the steering operation can be effected more smoothly.

Figure 7:
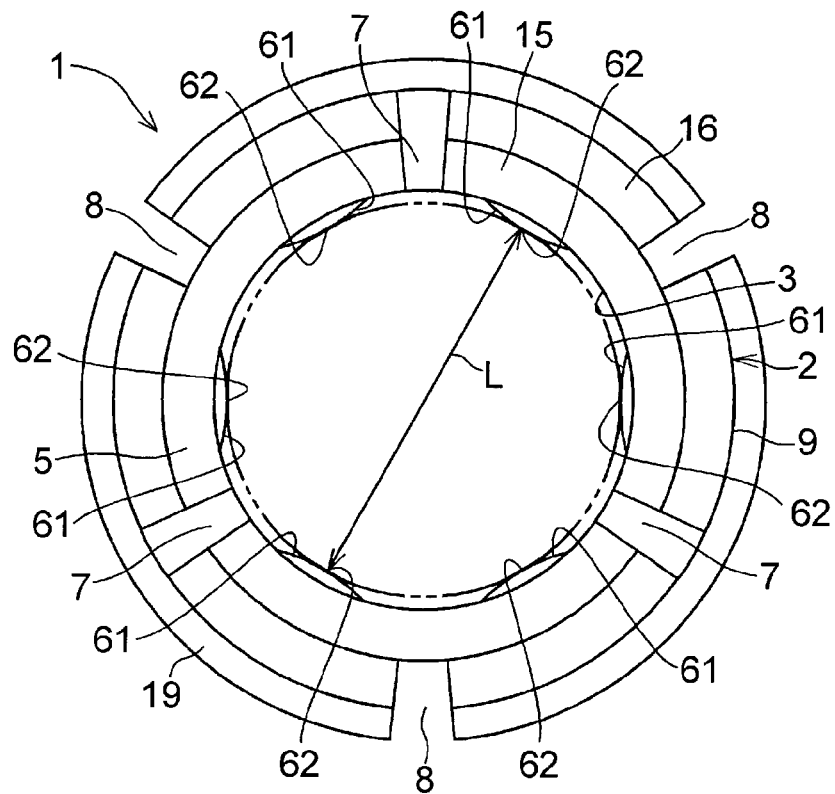
FIG. 7 is an explanatory diagram of a left side surface of another preferred embodiment of the invention.

With the above-described sliding bearing 1 for a steering column, the respective sliding surfaces are constituted by the flat surfaces 4, but the sliding surfaces may be alternatively constituted by arcuate convex surfaces 61, as shown in FIG. 7. In this case, the distance L between apices 62 of the convex surfaces 61 radially opposing each other is smaller than the inside diameter r of the inner peripheral surface 3 of the bearing body 2 at the end faces 5 and 6. The column shaft 41 is adapted to be tightened with the resiliency of the elastic rings 11 at the apices 62 of the convex surfaces 61.

Figure 8:
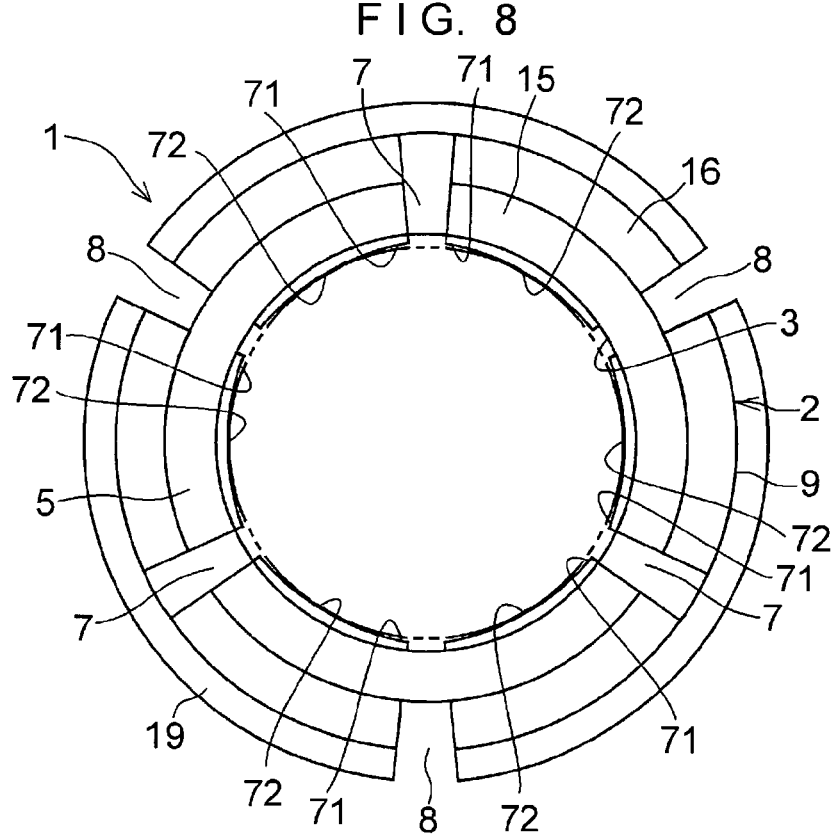
FIG. 8 is an explanatory diagram of a left side surface of still another preferred embodiment of the invention.
Figure 9:
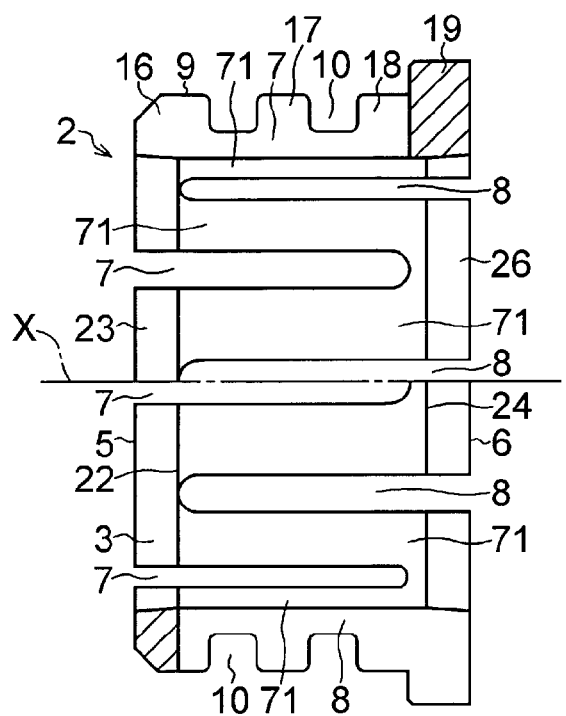
FIG. 9 is an explanatory view, taken in the direction of arrows along line IX—IX shown in FIG. 10, of still another preferred embodiment of the invention with the elastic rings omitted.
Figure 10:
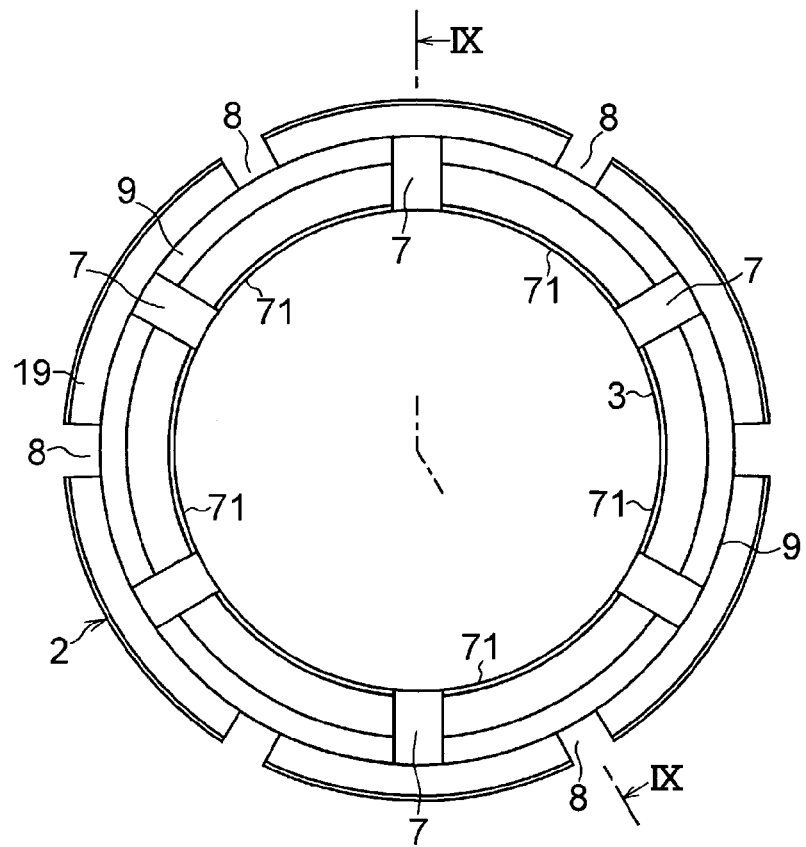
FIG. 10 is an explanatory diagram of a left side surface of the embodiment shown in FIG. 9.
Figure 11:
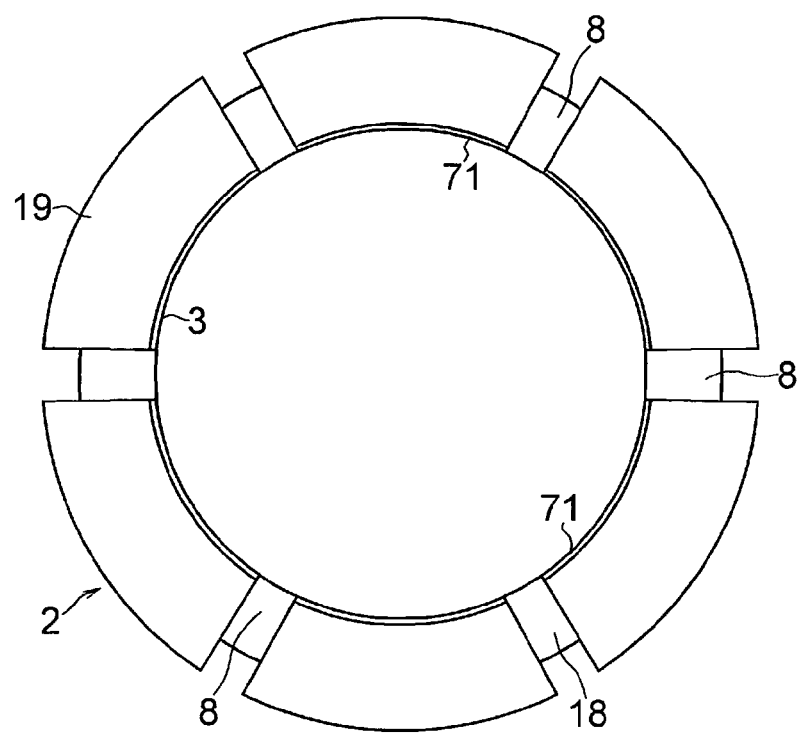
FIG. 11 is an explanatory diagram of a right side surface of the embodiment shown in FIG. 9.
Figure 12:
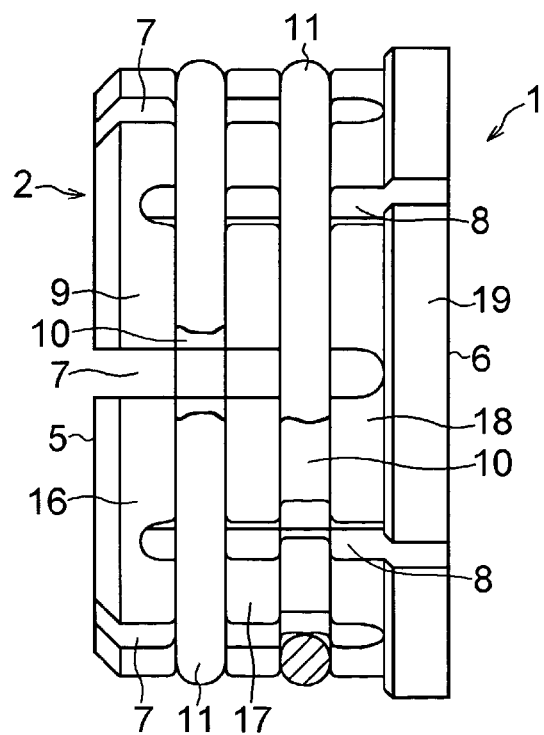
FIG. 12 is an explanatory appearance diagram also illustrating the elastic rings in the embodiment shown in FIG. 9.

Further, as shown in FIG. 8, the sliding surfaces may be constituted by arcuate concave surfaces 71. In this case, the concave surface 71 has a curvature smaller than that of the outer peripheral surface 42 of the column shaft 41. The distance L between bottoms 72 of the concave surfaces 71 radially opposing each other is smaller than the inside diameter r of the inner peripheral surface 3 of the bearing body 2 at the end faces 5 and 6. The column shaft 41 is adapted to be tightened with the resiliency of the elastic rings 11 at the bottoms 72 of the concave surfaces 71.

Figure 1:
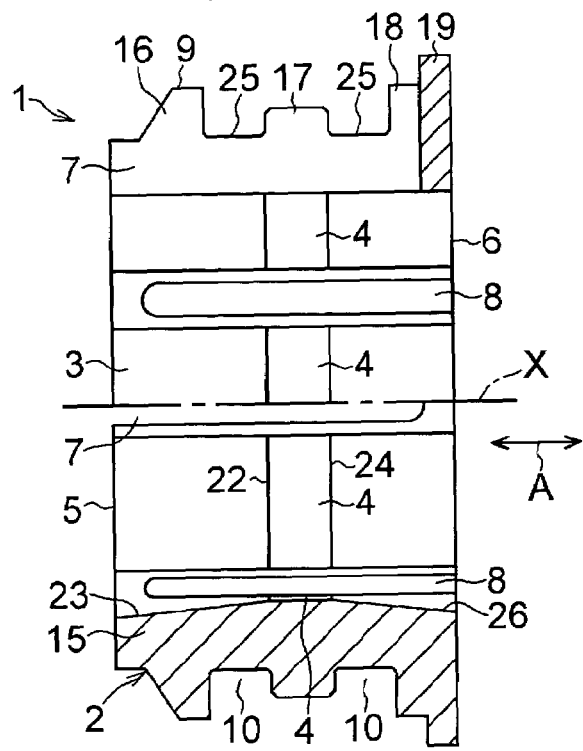
FIG. 1 is an explanatory view, taken in the direction of arrows along line I—I shown in FIG. 2, of a preferred embodiment of the invention with elastic rings omitted.
Figure 2:
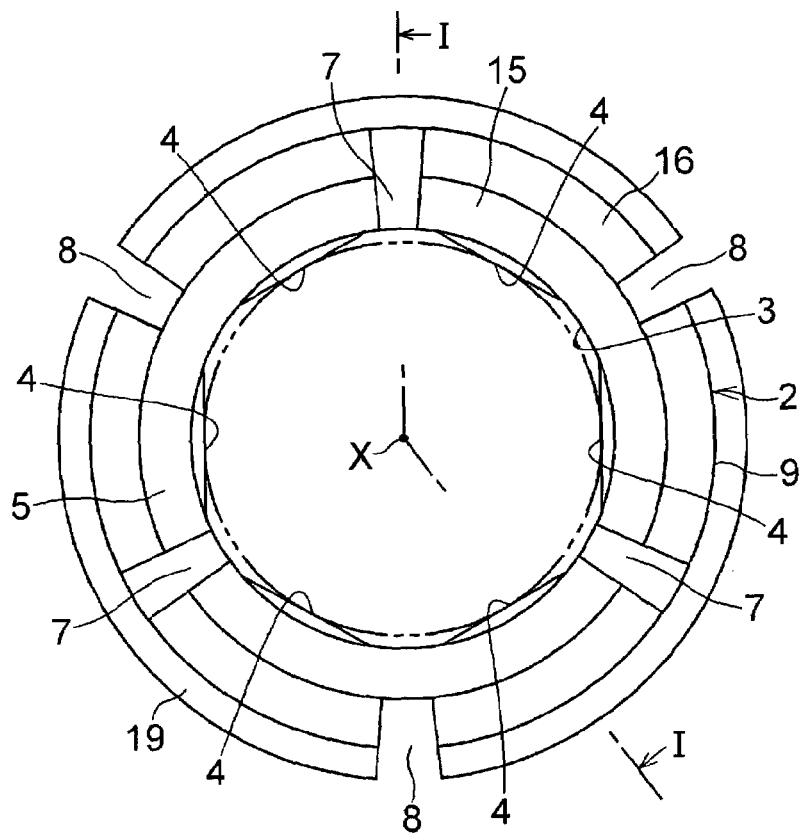
FIG. 2 is an explanatory diagram of a left side surface of the embodiment shown in FIG. 1.
Figure 3:
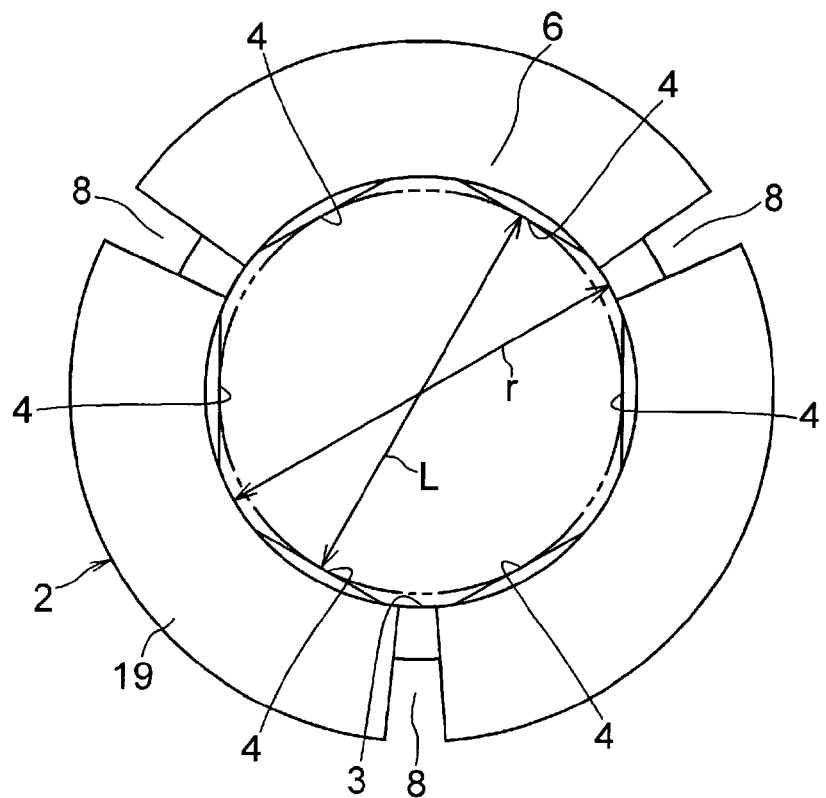
FIG. 3 is an explanatory diagram of a right side surface of the embodiment shown in FIG. 1.

With the sliding bearings 1 for a steering column shown in FIGS. 7 and 8 as well, similar effects are produced as they are used in the same way as the sliding bearing 1 for a steering column shown in FIG. 1.

The sliding bearing 1 for a steering column may be constructed by providing the slits 7 and 8 in greater numbers, as shown in FIGS. 9 to 12. The sliding bearing 1 for a steering column shown in FIGS. 9 to 12 has six slits 7 and six slits 8 (12 slits in total). The 12 sliding surfaces, which are respectively constituted by the arcuate concave surfaces 71 each having substantially the same curvature as that of the outer peripheral surface 42 of the column shaft 41, are respectively provided on the inner peripheral surface 3 of the bearing body 2 by extending beyond the two grooves 10 in the axial direction X.

Figure 13:
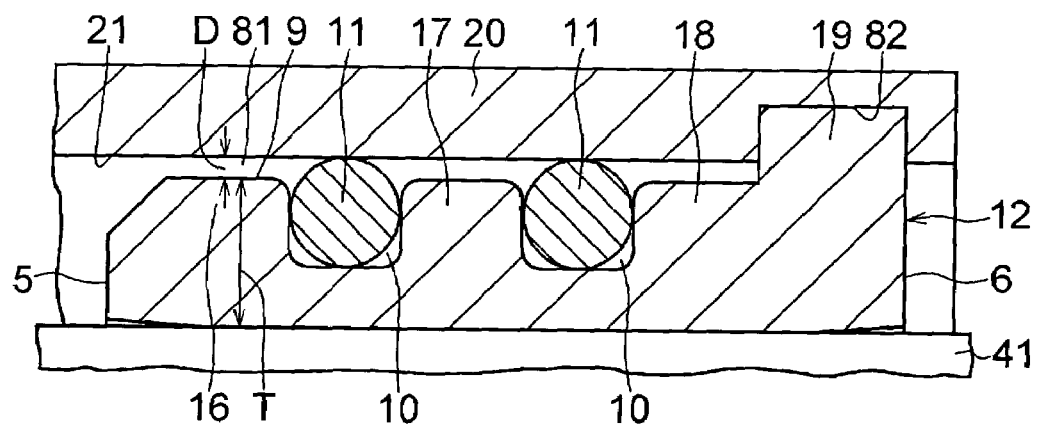
FIG. 13 is a partial enlarged explanatory diagram of the embodiment shown in FIG. 9.
Figure 14:
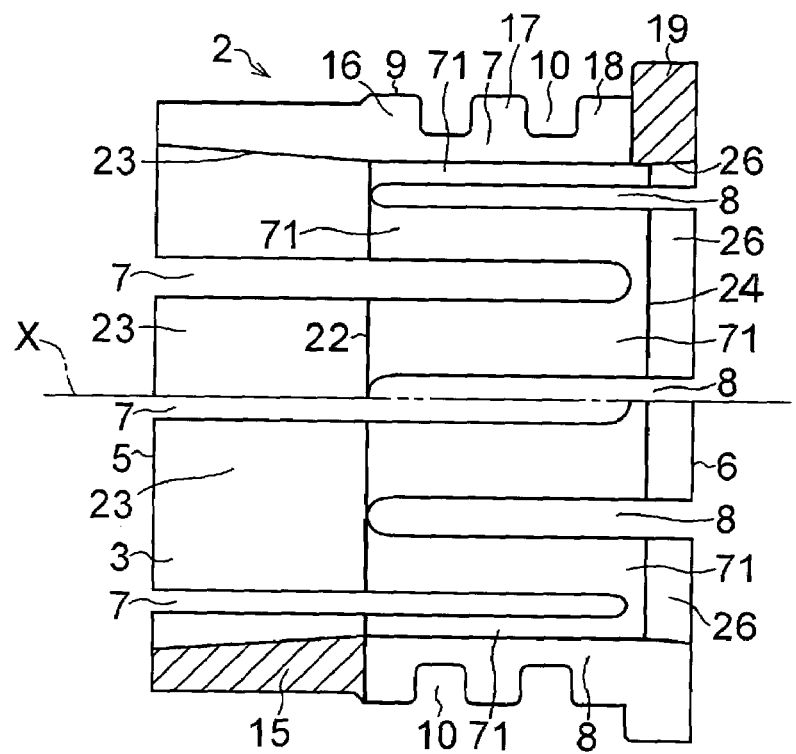
FIG. 14 is an explanatory view, taken in the direction of arrows along line XIV—XIV shown in FIG. 15, of a further preferred embodiment of the invention with the elastic rings omitted.
Figure 15:
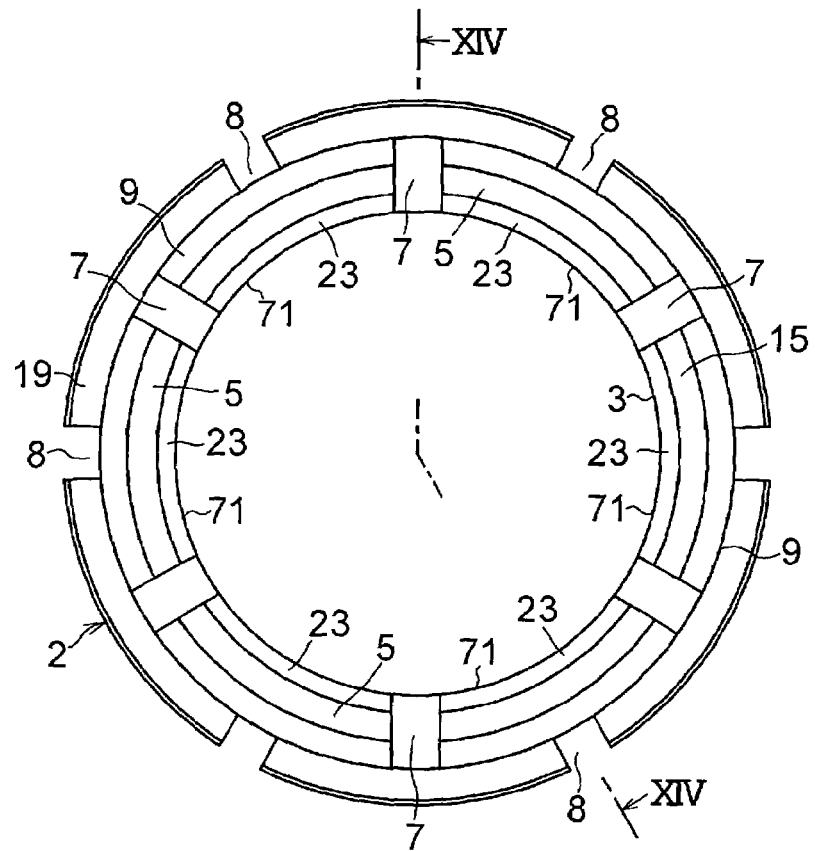
FIG. 15 is an explanatory diagram of a left side surface of the embodiment shown in FIG. 14.
Figure 16:
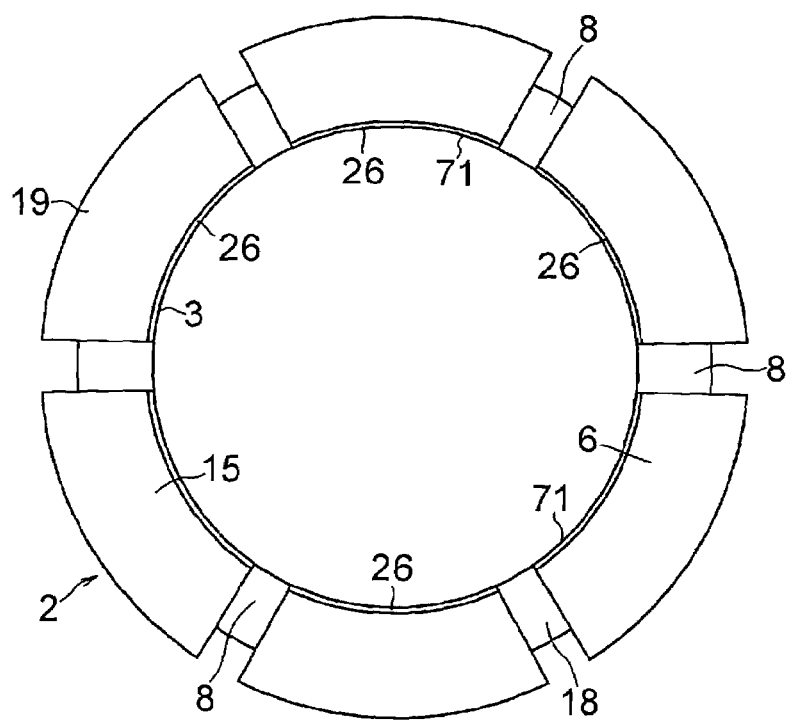
FIG. 16 is an explanatory diagram of a right side surface of the embodiment shown in FIG. 14.
Figure 17:
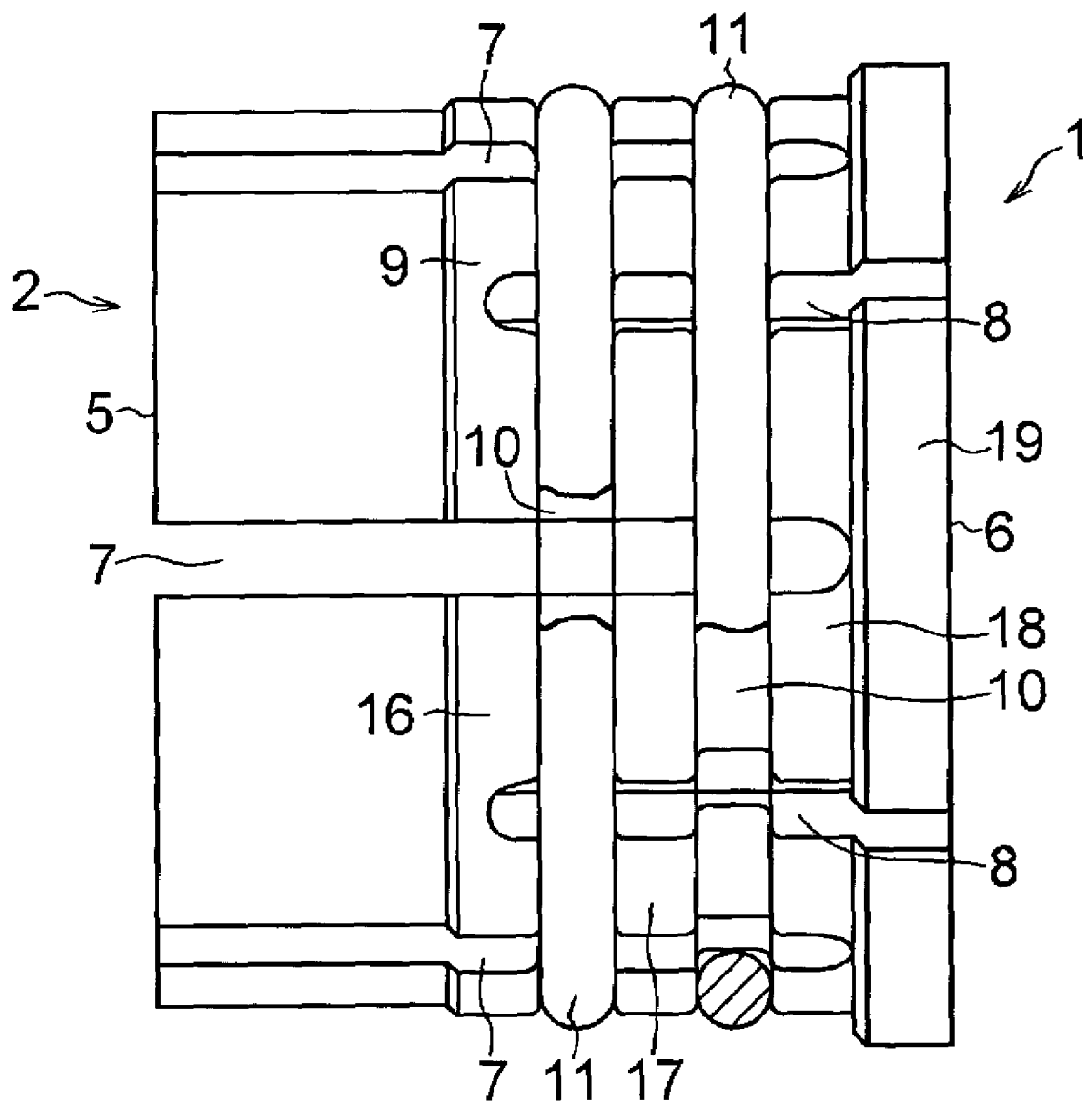
FIG. 17 is an explanatory appearance diagram also illustrating the elastic rings in the embodiment shown in FIG. 14.

As shown in FIG. 13, with the sliding bearing 1 for a steering column, a clearance 81 having a width (thickness) D of 0.3% to 10% of a radial maximum thickness T of the bearing body 2 at a portion constituting a free end portion with respect to the column tube 20, i.e., at the portion of the projection 16 on the end face 5 side not engaged with the column tube 20 in the above-described example, is adapted to be produced between the inner peripheral surface 21 of the column tube 20 and the outer peripheral surface 9 at the portion of the bearing body 2 constituting its free end portion. Consequently, it is possible to avoid the inner peripheral surface 21 of the column tube 20 from coming into contact with the outer peripheral surface 9 at the portion of the projection 16 of the bearing body 2. Further, the column tube 20 can be held reliably at a proper position with respect to the column shaft 41.

With the sliding bearing 1 for a steering column shown in FIGS. 9 to 12, since the multiplicity of slits 7 and 8 are provided, the sliding bearing 1 for a steering column can be easily deformed and made to undergo a reduction in diameter before it is fitted to the column tube 20. Therefore, instead of the pawl portions 51, an annular recessed portion 82 may be provided in the inner peripheral surface 21 of the column tube 20, and the collar 19 of the bearing body 2 may be fitted in the recessed portion 82, so as to prevent the sliding bearing 1 for a steering column from coming off from inside the column tube 20. Still alternatively, instead of the recessed portion 82, a through hole may be provided in the column tube 20, and the collar 19 of the bearing body 2 may be fitted in this through hole, so as to prevent the sliding bearing 1 for a steering column from coming off from inside the column tube 20.

With the above-described sliding bearing 1 for a steering column, the inner peripheral surface 3 of the bearing body 2 is formed with the tapered surfaces 23 and 26 having substantially equal lengths in the axial direction A. Alternatively, as in the case of the bearing body 2 and the sliding bearing 1 for a steering column shown in FIGS. 14 to 17, the tapered surface 23 may be formed with a length in the axial direction A greater than the length in the axial direction A of the tapered surface 26 and with a cone angle greater than the cone angle of the tapered surface 26. In this case, the portion of the hollow cylindrical portion 15 where the tapered surface 23 has been formed has a sufficiently large length in the axial direction A in comparison with the portion of the hollow cylindrical portion 15 where the tapered surface 26 has been formed. According to the bearing body 2 having such a tapered surface 23 and shown in FIGS. 14 to 17, the bearing body 2 can be easily fitted to the outer peripheral surface 42 of the column shaft 41 from the tapered surface 23 side. Consequently, it is possible to substantially reduce the number of assembly steps.

The sliding bearing 1 for a steering column has been described above which is interposed between the column tube 20 and the column shaft 41 and serves as one example of the sliding bearing. However, such a sliding bearing may be interposed between a rack shaft serving as a shaft and a tubular member serving as a tube, so as to support the rack shaft linearly movably.

What is claimed is:

1. A sliding bearing comprising:
   a cylindrical bearing body;
   a plurality of sliding surfaces provided on an inner peripheral surface of said bearing body and spaced apart from each other in a circumferential direction;
   a first slit portion provided in said bearing body and extending in an axial direction from one end face of said bearing body toward another end face of said bearing body;
   a second slit portion provided in said bearing body and extending in the axial direction from the other end face of said bearing body toward the one end face of said bearing body;
   at least one annular groove portion provided in an outer peripheral surface of said bearing body; and
   an elastic ring which is fitted in said groove portion in such a manner as to radially outwardly project partially from the outer peripheral surface of said bearing body and to reduce an inner diameter of said bearing body.

2. The sliding bearing according to claim 1, wherein said first slit portion and said second slit portion are provided in plural numbers in said bearing body, each of said slit portions extends in the axial direction between adjacent ones of said sliding surfaces, and each of said first slit portions and each of said second slit portions are arranged alternately in the circumferential direction.

3. The sliding bearing according to claim 1, wherein each of said sliding surfaces is provided on the inner peripheral surface of said bearing body between two portions, one of which is axially spaced apart a predetermined distance from the one end face of said bearing body, the other one of which is axially spaced apart a predetermined distance from the other end face of said bearing body.

4. The sliding bearing according to claim 1, wherein said plurality of sliding surfaces are arranged at equal intervals in the circumferential direction.

5. The sliding bearing according to claim 1, wherein said elastic ring has a volume greater than a volumetric capacity of said groove portion.

6. The sliding bearing according to claim 1, wherein each of said sliding surfaces is one of a flat surface, an arcuate convex surface, and an arcuate concave surface.

7. The sliding bearing according to claim 1, wherein each of said sliding surfaces is a flat surface, and a distance between said sliding surfaces radially opposing each other and parallel to each other is smaller than an inside diameter of said bearing body at each of the end faces thereof.

8. The sliding bearing according to claim 1, wherein each of said sliding surfaces is an arcuate convex surface, and a distance between apices of said sliding surfaces radially opposing each other is smaller than an inside diameter of said bearing body at each of the end faces thereof.

9. The sliding bearing according to claim 1, wherein each of said sliding surfaces is an arcuate concave surface, and a distance between bottoms of said sliding surfaces radially opposing each other is smaller than an inside diameter of said bearing body at each of the end faces thereof.

10. The sliding bearing according to claim 1, wherein said plurality of sliding surfaces and said bearing body are integrally formed of a synthetic resin.

11. The sliding bearing according to claim 1, wherein at least two groove portions axially spaced apart from each other are provided in the outer peripheral surface of said bearing body, at least two elastic rings are respectively fitted in said groove portions in such a manner as to project from the outer peripheral surface of said bearing body and to reduce the diameter of said bearing body, and an axially central portion of each of said sliding surfaces is located between said two groove portions in the axial direction.

12. The sliding bearing according to claim 11, wherein each of said sliding surfaces is provided on the inner peripheral surface of said bearing body between said two groove portions in the axial direction.

13. The sliding bearing according to claim 11, wherein each of said sliding surfaces is provided on the inner peripheral surface of said bearing body by extending beyond said two groove portions in the axial direction.

14. The sliding bearing according to claim 1, wherein said elastic ring at an outer peripheral surface thereof is fitted to an inner peripheral surface of a tube with an interference, and said bearing body is fitted at the sliding surface thereof on an outer peripheral surface of a shaft by tightening the shaft with the resiliency of said elastic ring, to cause said bearing body to be interposed between the tube and the shaft.

15. The sliding bearing according to claim 14, wherein said shaft is a steering column shaft, and said tube is a steering column tube.

16. The sliding bearing according to claim 14, wherein said shaft is a rack shaft, and said tube is a tubular member.

17. The sliding bearing according to claim 14, wherein each of said sliding surfaces is a flat surface, and each of said sliding surfaces at an axially central portion thereof is adapted to tighten the shaft with the resiliency of said elastic ring.

18. The sliding bearing according to claim 14, wherein each of said sliding surfaces is an arcuate convex surface, and each of said sliding surfaces at an apex thereof is adapted to tighten the shaft with the resiliency of said elastic ring.

19. The sliding bearing according to claim 14, wherein a clearance having a width of 0.3% to 10% of a radial maximum thickness of said bearing body at a portion, which constitutes a free end portion of the bearing body with respect to the tube, is produced between the inner peripheral surface of the tube and the outer peripheral surface of said bearing body at the portion constituting the free end portion thereof.

20. The sliding bearing according to claim 14, wherein each of said sliding surfaces is an arcuate concave surface, and each of said sliding surfaces at a bottom thereof is adapted to tighten the shaft with the resiliency of said elastic ring.

21. The sliding bearing according to claim 20, wherein the arcuate concave surface has a curvature smaller than that of the outer peripheral surface of the shaft or a curvature substantially equal thereto.

22. The sliding bearing according to claim 1, wherein the inner peripheral surface of said bearing body has a first tapered surface extending with a gradually reduced diameter from the one end face of said bearing body to an axial one end of said sliding surface, as well as a second tapered surface extending with a gradually reduced diameter from the other end face of said bearing body to an axial other end of said sliding surface.

23. The sliding bearing according to claim 22, wherein said first tapered surface has an axial length greater than that of said second tapered surface.

24. The sliding bearing according to claim 22, wherein said first tapered surface has a cone angle greater than that of said second tapered surface.

25. A bearing mechanism comprising:
a tube;
a shaft inserted and fitted in said tube; and
said sliding bearing according to claim 1 interposed between said tube and said shaft,
said elastic ring at the outer peripheral surface thereof being fitted to the inner peripheral surface of said tube with an interference, said bearing body being disposed on the inner peripheral surface of said tube with a clearance between the outer peripheral surface thereof and the inner peripheral surface of said tube, and said bearing body being fitted on an outer peripheral surface of said shaft by tightening said shaft with the resiliency of said elastic ring by means of said sliding surfaces.

26. The bearing mechanism according to claim 25, wherein an outside diameter of said elastic ring is greater than a diameter of the inner peripheral surface of said tube, and an inside diameter of said elastic ring is smaller than a diameter of the bottom of said groove portion.

27. The bearing mechanism according to claim 25, wherein said tube integrally has a pawl portion which engages said bearing body.

28. The bearing mechanism according to claim 25, wherein said tube has one of a recessed portion and a through hole which engages said bearing body.

* * * * *